(12) United States Patent
Ma et al.

(10) Patent No.: US 6,674,900 B1
(45) Date of Patent: Jan. 6, 2004

(54) METHOD FOR EXTRACTING TITLES FROM DIGITAL IMAGES

(75) Inventors: Yue Ma, West Windsor, NJ (US); Min Yi, Revere, MA (US)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/537,931

(22) Filed: Mar. 29, 2000

(51) Int. Cl.⁷ .................................................. G06K 9/34
(52) U.S. Cl. ...................... 382/176; 382/180; 382/270
(58) Field of Search ................................. 382/173, 176, 382/177, 180, 270, 271

(56) References Cited

U.S. PATENT DOCUMENTS

| | | | |
|---|---|---|---|
| 5,649,025 | * 7/1997 | Revankar | 382/171 |
| 5,781,658 | 7/1998 | O'Gorman | |
| 5,818,978 | 10/1998 | Al-Hussein | |
| 5,889,885 | * 3/1999 | Moed et al. | 382/172 |
| 5,892,843 | 4/1999 | Zhou et al. | |

OTHER PUBLICATIONS

Iwane et al. "A Functional Classification Approach to Layout Analysis of Document Images." Proc. 2ⁿᵈ Int. Conf. on Document Analysis and Recognition, Oct. 20, 1993, pp. 778–781.*

(List continued on next page.)

Primary Examiner—Jon Chang
(74) Attorney, Agent, or Firm—Amster, Rothstein & Ebenstein LLP

(57) ABSTRACT

A method of delineating titles within a grayscale image, in which a grayscale image is received, e.g., by scanning a document, and then is subjected to multi-level thresholding to obtain a plurality of binary images representing the original grayscale image. Each of the binary images is preferably pre-processed to filter any noise components from each of the binary images, and then all connected components within each of said binary images are identified, optionally filtered, and then clustered to identify possible title regions within each of the binary images. Next, each binary image is preferably post-processed to merge possible title regions comprising strokes and to remove non-title regions from the previously identified possible title regions in each of the images by comparing characteristics of the previously identified possible title regions to pre-determined criteria. Further, certain of the previously identified possible title regions within each of the binary images which satisfy pre-determined criteria are merged together. Still further, title regions within each of the binary images are combined after the post-processing step and the merging step. Finally, certain of the previously identified possible title regions for different layers are preferably merged to identify all possible title regions. Once the title region are located, various processing can be performed to extract the text from the title region.

18 Claims, 10 Drawing Sheets

OTHER PUBLICATIONS

Saitoh et al. "Document Image Segmentation and Text Area Ordering." Proc. 2nd Int. Conf. on Document Analysis and Recognition, Oct. 20, 1993, pp. 323–329.*

Wang et al. "A New Method of Character Line Extraction from Mixed–Unformatted Document Image for Japanese Mail Address Reocgnition." Proc. 5th Int. Conf. on Document Analysis and Recognition, Sep. 20, 1999, pp. 769–772.*

Chutatape et al. "Automatic License Number Extraction and Its Parallel Implementation." Proc. 25th Annual conf. of the IEEE Industrial Electronics Society, vol.2, Nov. 29, 1999, pp. 704–709.*

L. O'Gorman, Binarization and multi–thresholding of document images using connectivity, In Proc. 3rd Annual Symposium on Document Analysis and Information Retrieval, pp. 237–252, Apr. 1994.

C. Faloutsos, R. Barbe, M. Flickner, J. Hafner, W. Niblack, D. Petkovic and W. Equitz, Efficient and effective querying by image context.Journal of Intelligent Information Systems, 3, pp. 231–262, 1994.

Y. Zhong, L. Karu and A.K. Jain, Locating text in complex color images, In Proc. 3rd Int'l Conf. on Document Analysis and Recognition, Montreal, pp. 146–149, Aug. 1995.

R.M. Haralick and I. Phillips, Document structural decomposition, In Proc. Symposium on Document Image Understanding Techinology, Bowie, Maryland, 1995.

* cited by examiner

METHOD FOR EXTRACTING TITLES FROM DIGITAL IMAGES

FIELD OF THE INVENTION

The present invention relates generally to the access of computerized information. More particularly, the invention relates to a method for extracting title text or other textual regions from bitmap images, such as are generated when documents are scanned. The extracted title text may be used in a number of ways, including keyword searching or indexing of bitmap image databases. In certain cases, the extracted title text may provide all the information needed, such as newspaper headlines.

BACKGROUND OF THE INVENTION

The world is rapidly becoming an information society. Digital technology has enabled the creation of vast databases containing a wealth of information. The recent explosion in popularity of image-based systems is expected to lead to the creation of enormous databases that will present enormous database access challenges. In this regard, the explosion in popularity of the World Wide Web is but one example of how information technology is rapidly evolving towards an image-based paradigm.

Image-based systems present a major challenge to information retrieval. Whereas information retrieval technology is fairly well advanced in coded character-based systems, these retrieval techniques do not work in image-based systems. That is because image-based systems store information as bitmap data that correspond to the appearance of the printed page and not the information content of that page. Traditional techniques require the conversion of bitmap data into text data, through optical character recognition (OCR) software, before information retrieval systems can go to work.

Unfortunately, optical character recognition software is computationally expensive, and the recognition process is rather slow. When dealing with large quantities of image-based data, it is not practical to perform optical character recognition on the entire database. Furthermore, even where time and computational resources permit the wholesale OCR conversion of image data into text data, the result is still a large, unstructured database, without a short list of useful keywords that might allow a document of interest to be retrieved and reviewed. Searching through the entire database for selected keywords may not be the optimal answer, as often full text keyword searches generate far too many hits to be useful. In addition, other drawbacks of OCR conversion include difficulty in providing adequate results when a document includes noise (such as that caused by transmission by facsimile), variable fonts or grayscale images. Therefore, there is a need for a method of extracting only key portions of a document which includes text that provides a description of the remaining portion of the document, such as titles.

U.S. Pat. No. 5,818,978 ("the '978 Patent") discloses a character recognition system which is used to enhance prior art optical character recognition methods by thresholding a grayscale image and then locating characters using prior art segmentation techniques. However, because the system of the '978 Patent uses traditional segmentation methods on binary images thresholded at only a single level, unreasonable results will be produced for documents with complex graphics or documents having multiple regions with similar grayscale intensities.

U.S. Pat. No. 5,892,843 ("the '843 Patent"), assigned to the same assignee as the present invention, discloses a system for extracting titles, captions and photos from scanned images. However, since the '843 Patent, like the '978 Patent, uses traditional segmentation methods on a binary image (which may have been generated by thresholding a grayscale image), documents with complex graphics or documents having multiple regions with similar grayscale intensities will be processed by the system of the '843 Patent with less than ideal results. In addition, the method of the '843 Patent requires that the language of any document being processed be identified prior to processing. Other drawbacks of the method of the '843 Patent include an inability to locate titles positioned on more than one line, titles located within a photographic region, or titles having reverse video (i.e., white letters on a black background).

It is therefore an object of the present invention to provide a method for extracting titles and headlines from a scanned image which provides more reliable results than prior art methods of title extraction when the image has complex graphics or regions of similar grayscale intensities.

It is an additional object of the invention to provide a method for extracting titles and headlines from a scanned image which extracts titles positioned on more than one line.

It is yet a further object of the invention to provide a method for extracting titles and headlines from a scanned image which extracts titles within photographic regions.

It is another object of the invention to provide a method for extracting titles and headlines from a scanned image which extracts titles consisting of reverse video.

It is yet another object of the invention to provide a method for extracting titles and headlines from a scanned image which does not require that the language of the document being processed be identified prior to such processing.

Various other objects, advantages and features of the present invention will become readily apparent from the ensuing detailed description and the novel features will be particularly pointed out in the appended claims.

SUMMARY

The present invention is directed to a method of delineating titles within a grayscale image, in which a grayscale image is received, e.g., by scanning a document, and then is subjected to thresholding, preferably of a multi-level nature, to obtain, preferably, a plurality of binary images representing the original grayscale image. Each of the binary images is preferably pre-processed to filter any noise components therein, and then all connected components within each of the binary images are identified and clustered to identify possible title regions therein. Next, each binary image is preferably post-processed to merge possible title regions comprising strokes and to remove non-title regions, e.g., photographic regions, from the previously identified possible title regions in each of the images by comparing characteristics of the previously identified possible title regions to pre-determined criteria. Further, certain of the previously identified possible title regions within each of the binary images which satisfy pre-determined criteria are preferably merged together. Still further, previously identified possible title regions, remaining after the optional post-processing and merging steps from each of the binary images are combined. Finally, certain of the previously identified possible title regions from separate binary images are preferably merged to produce identified title regions for further processing, e.g., for use as a mask to extract the title text from the original image.

Preferably, the multi-level thresholding step is performed by generating a histogram of the number of runs that would result from thresholding the grayscale image at each intensity level within the grayscale image. Then a sliding profile of the histogram is generated and the peaks within the sliding profile are identified. The value at each of the peaks of the sliding profile is identified and those values are used for thresholding the grayscale image to produce a plurality of binary images.

Three methods are presented for performing the preprocessing step. The first method comprises an adaptive morphological method consisting of a recursive series of erosion steps and dilation steps. The second method consists of a hole-filling method comprising the steps of first generating a sliding window having a center region and four outer regions, and then moving the sliding window across the binary image. At each point within said binary image, the number of zero value pixels in each outer region are calculated. When each outer region contains at least one zero value pixel therein and when the sum of the number of zero value pixels in each outer region is greater than a first predetermined value, the pixel corresponding to the center region is set to 0, and when the sum of the number of zero value pixels in each outer region is less than or equal to a second predetermined value, the pixel corresponding to the center region is set to 1. Finally, the third method, which is the preferred method, comprises a morphological method by which a simple opening operation is performed using a predetermined structural element.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
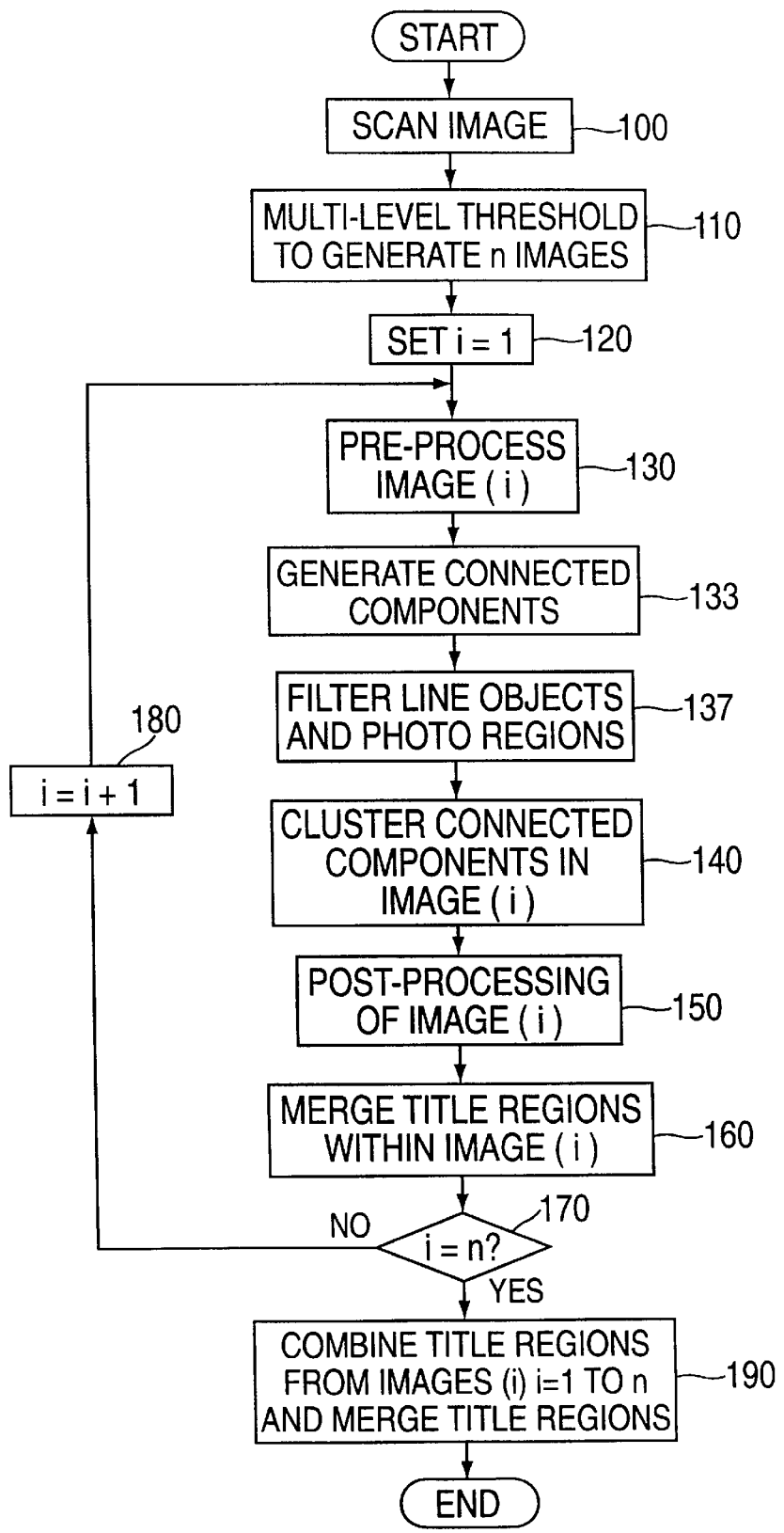
FIG. 1 is a flow chart of the method of the present invention.

Referring now to the drawing, and in particular, FIG. 1, which illustrates the steps involved in the present invention. In overview, a multi-level thresholding method (step 110) is first applied to a grayscale image of a document (scanned at step 100) to produce one or more binary images representing different intensity levels within the grayscale image, connected components are identified, then title regions are identified from those connected components in each layer and finally the title regions from the various layers are combined. A bottoms-up approach is used to extract the title regions, whereby title regions in each layer are first identified and then clustered into larger title regions, because no a priori knowledge is available about the original document. As recognized by those of ordinary skill in the art, connected components are a maximal set of touching black pixels in a binary image.

Referring to FIG. 1, a document is first scanned at step 100 to produce a grayscale image. As one of ordinary skill in the art will readily recognize, various other methods may alternatively be used to obtain the grayscale image, including, e.g., using a digital camera or receiving a digitized image from a third party source. The grayscale image is then subjected to a multi-level threshold step 110 to separate the grayscale image into n different binary images (layers) (i.e., IMAGE(i) for i=1 to n). This step is described in further detail below. The number n of layers that result from step 110 depends on the complexity of the original document, as discussed below. An index i is set to 1 at step 120 which is used to loop through steps 130–160 for each layer produced by step 110. Because there may be some noise or some holes in the background which may connect title characters together, the first step to which each layer is preferably subjected is preprocessing step 130 which filters out very small connected components and eliminates thin lines, thereby breaking up any connected components which might have been connected by the eliminated thin lines. Step 133 processes each image to identify all of the connected components located therein. Step 137 may preferably filter certain line objects and may preferably extract certain photographic regions. Next, at step 140, connected components are clustered, as discussed in further detail below. Post-processing is preferably applied at step 150 which merges strokes (i.e., the elements of a language such as Chinese or Japanese wherein the characters are composed of a series of isolated strokes) and filters non-title regions pursuant to a pre-determined set of conditions, as discussed in further detail below. Finally, at step 160, title elements belonging to the same title which have been clustered into different groups within the particular layer being operated upon are merged together. At step 170, index i is checked against the total number of layers, n, and if i is not equal to n then index i is incremented at step 180. Thereafter, processing continues at step 130 for the next layer. If i is determined to be equal to n at step 170, then every layer has been processed by steps 130–160 and, at step 190, the titles within separate layers of IMAGE(i) are combined and all title elements belonging to the same title which have been segmented into different layers are merged together.

Referring now to step 110 of FIG. 1 and FIGS. 2–4, thresholding is a common image processing operation that is applied to grayscale (or color images) to obtain a binary image or a set of multi-level binary images. A number of methods are known to one of ordinary skill in the art which perform multi-level thresholding. One such method was described by Laurence O'Gorman in his article "Binarization and Multi-Thresholding of Document Images Using Connectivity" presented as part of the papers of the *Third Annual Symposium on Document Analysis and Retrieval*, Apr. 11–13, 1994 ("the O'Gorman Paper"). The O'Gorman method is global in approach but uses a measure of local connectivity information such that threshold values are found at intensity levels which best preserve the connectivity of regions within the image. Intensity level refers to each discrete value which could be given to each pixel in a grayscale image (e.g., an eight bit grayscale image has 256 intensity levels). In this manner, the O'Gorman method takes advantages of both global and locally adaptive approaches. Although O'Gorman's method works reasonably well in conjunction with the present invention, as one of reasonable skill in the art will readily realize, various other methods may also be used. The O'Gorman method of multi-level thresholding is somewhat time-intensive and thus does affect the performance of the method of the present invention. However at this point it is the preferred method.

The O'Gorman method has three steps:

1. Determine a histogram of the number of runs, i.e., sequences of consecutive (connected) ON-valued pixels along a row or column, that result from thresholding the original grayscale image at each intensity level;
2. Determine a "sliding profile", as described below, of the histogram which yields a measure of the flatness, i.e., the lack of variation of runs, for ranges around each intensity level within the histogram; and
3. Select the number of thresholds as the number of peaks within the sliding profile with each threshold is chosen as the intensity at the associated peak.

The O'Gorman Paper presents an algorithm for calculating the number of runs in each intensity level of a grayscale image which does not require that a plurality of binary images, one for each separate intensity level within the grayscale image, be generated from the original image by thresholding at each intensity level.

Figure 2:
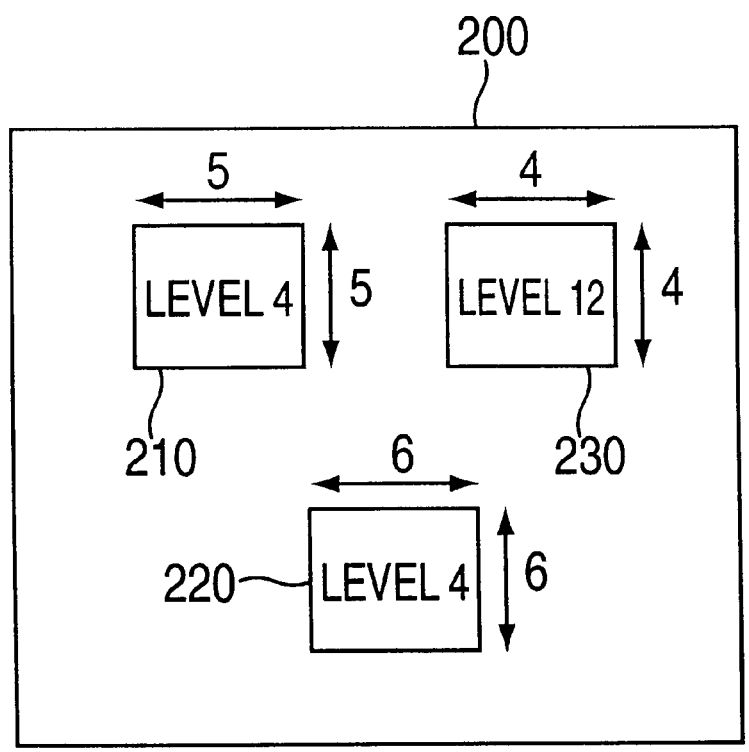
FIG. 2 is a simulated image used to illustrate the multi-level thresholding step of the present invention.

Referring to FIG. 2, illustrated sample image 200 has two regions 210 and 220 having an intensity level of 4 and a third region 230 having an intensity of 12. A run is defined as a sequence of consecutive (connected) ON-valued pixels along a row or column. The upper left region 210 (intensity level 4) within FIG. 2 has a 5×5 pixel size and thus contributes 10 runs. The second region 220 of intensity level 4 has a 6×6 pixel size and thus contributes 12 runs. Finally, upper right region 230 has a pixel size of 4×4 and thus contributes 8 runs.

Figure 3:
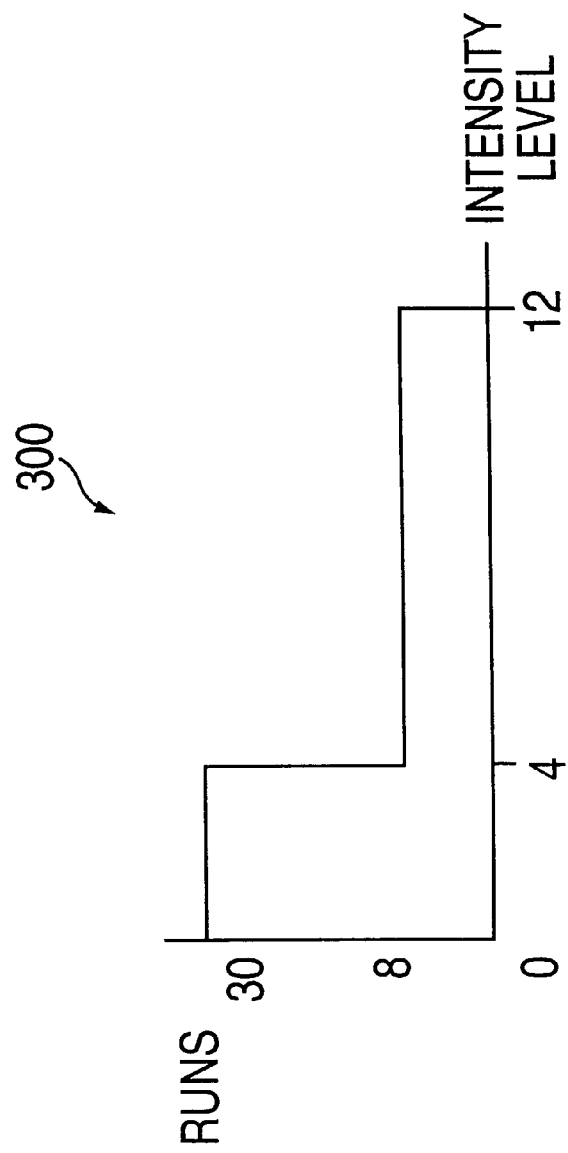
FIG. 3 is a histogram of the number of runs found per intensity level in the scanned image.
Figure 4:
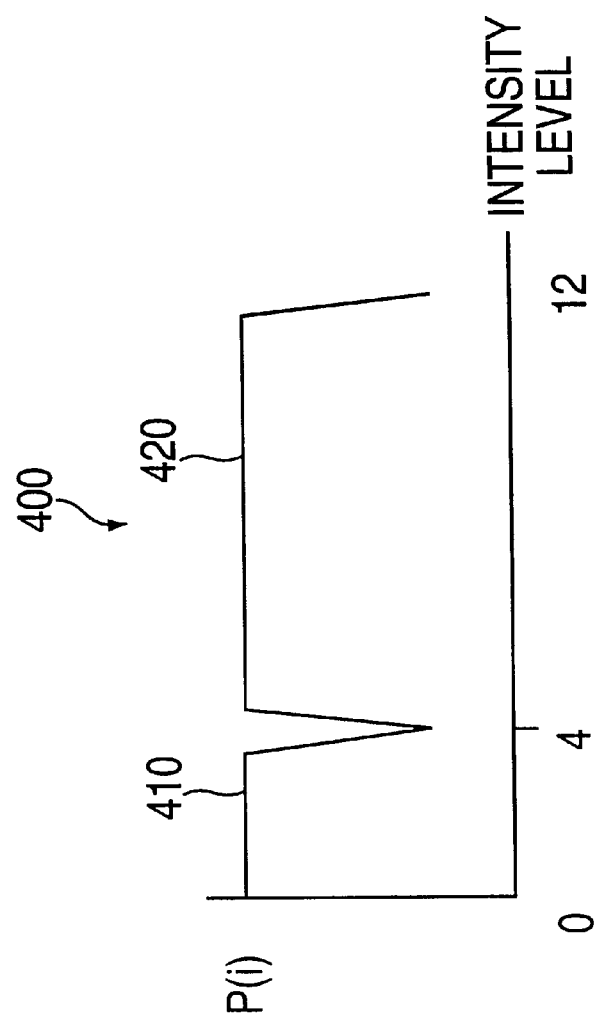
FIG. 4 is a sliding profile of the histogram of FIG. 3.

Referring now to FIG. 3, when the thresholding is performed at each intensity level from 1 to 4, thirty runs will be found, since all three regions 210–230 have an intensity of 4 or greater and thus contribute all runs, as shown in histogram 300 of FIG. 3. Between an intensity of 4 and an intensity of 12, only upper right region 230 in FIG. 2 will contribute runs, and thus histogram 300 of FIG. 3 shows a value of 8 for intensities between 4 and 12. Finally, above an intensity of 12, there are no regions have such values and thus histogram 300 of FIG. 3 has a value of zero above an intensity of 12.

The sliding profile is determined by first finding a measure of the deviation around each intensity by calculating the following:

$$d_i = \sum_{j=w/2}^{w/2} |R(i) - R(j)| \qquad (1)$$

where $d_i$ is the sum of differences within a window of width w, at intensity i, and R(i) is the number of runs at that intensity. The sliding profile, P(i), at each intensity is determined as the following:

$$P(i) = \exp\left(-\frac{1}{2}\left(\frac{d_i}{\sigma}\right)^2\right) \qquad (2)$$

where σ is the standard deviation of the Gaussian-shaped curve.

The window width w chosen for equation (1) should be as large as possible to reduce noise by averaging, but smaller than the minimum intensity range between region levels. This range is called the minimum contrast. As a result of this step, the graph of P(i) shown in FIG. 4 results. To determine the number of thresholds, the number of peak values within the sliding profile is determined. Each of the peaks 410 and 420 represents a plateau (region of flatness) on histogram 300. Because the number of runs remains approximately constant within a plateau, the intensity ranges between plateaus can be seen to correspond to intensity transitions between region levels. Therefore, the threshold values for the image of FIG. 2 are (1) 1–3 for the first threshold and (2) 5-11 for the second threshold. As one of ordinary skill in the art will recognize, any value on a peak will provide acceptable thresholding results (e.g., a threshold of 1, 2 or 3 will produce the same results for the first threshold of the image of FIG. 2). In the preferred embodiment, the maximum value of a peak is chosen for the threshold, although, as one of reasonable skill in the art will recognize, various other methods may be used to select the actual threshold point.

Three images will result from the multi-level thresholding of the image of FIG. 2. The first image will include all pixels having an intensity value less than or equal to the first threshold value, e.g., 3, and thus will include all pixels except for those in the three regions 210–230. The second image will consist of all pixels having an intensity value greater than the first threshold value but less than or equal to the second threshold value, e.g., 10, and thus will include the two regions 210 and 220 having an intensity value of 4. Finally, the third image will include all pixels having an intensity value of greater than the second threshold value and thus will include only region 230 having an intensity of 12.

In an image produced by multi-level thresholding, a number of different kinds of noise exist. One such type of noise is the inclusion of speckle noise. Another type of noise is the inclusion of many holes in both the background and the front title characters. When these holes are large, some characters may connect together and affect the title extraction result. Therefore, a first pre-processing step 130 (FIG. 1) is preferably used to remove these types of noise before the clustering step 140. As one of reasonable skill in the art will recognize, the method of the present invention produces acceptable results without such pre-processing for many types of documents. Three alternative methods for performing preprocessing step 130 are presented as part of the present invention.

The first method for preprocessing presented is a recursive morphological method, wherein a series of morphological opening (i.e., an erosion step followed by a dilation step) operations are performed. This method is recursive and starts with an opening structural element having a predetermined size. A series of opening operations are performed, increasing the size of the opening structural element after each operation, until certain predetermined criteria are met. In this manner, the size of the opening structural element at each recursive step is adaptively chosen. This method is particularly suited for extracting large title characters, and removes certain thin connections between components which should not be connected, and also eliminates certain small text characters, thereby reducing the burden for the later processing.

To understand this adaptive morphological method, first it is assumed that title components cover 1/k of the total document area (document size), where k is a pre-determined parameter. This method attempts to reduce the possible title component area when the current possible title components area covers more than 1/k of the document area by performing a recursive opening step, having a larger structure element, until the possible tide components area is less than 1/k of the document area. The steps involved in this method are illustrated in the flowchart of FIG. 5.

Figure 5:
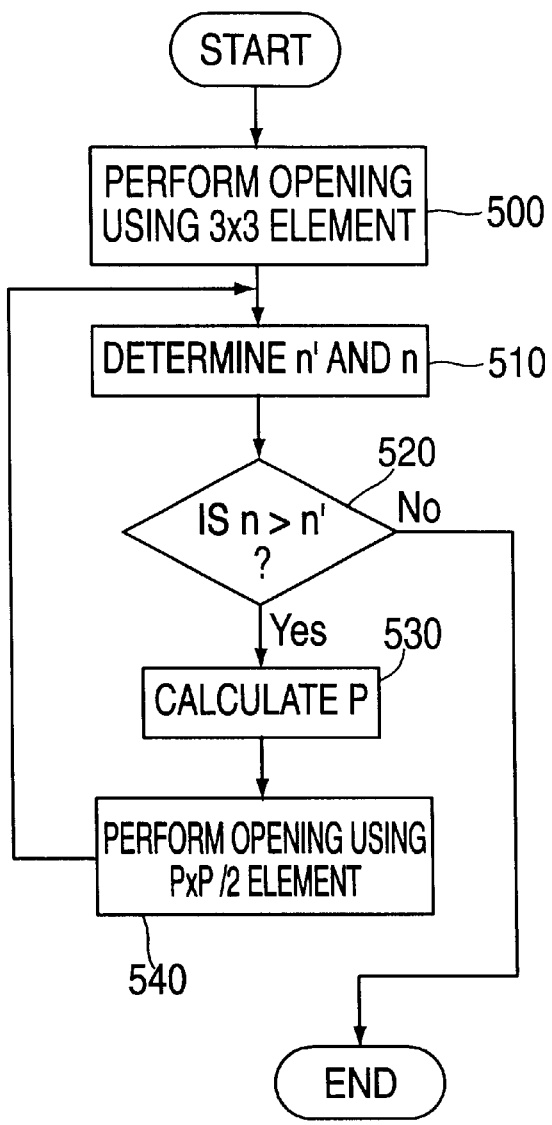
FIG. 5 is a flowchart of one pre-processing method of the present invention.

Referring now to FIG. 5, a morphological opening operation (step 500) with a pre-defined small structure element (e.g., 3×3 corresponding to the expected minimum stroke width of three pixels for a character within a title region in the preferred embodiment) is first performed to eliminate speckle noise.

Next, the area of the remaining connected components after this first step is estimated using the equation $\overline{nwh}$, where n is the number of the current connected components, $\overline{w}$ is the average height of the current connected components and $\overline{h}$ is the average height of the current connected components. The variables $\overline{w}$ and $\overline{h}$ are calculated according to the equations:

$$\overline{w} = \sum_{i=1}^{n} w_i \quad (3)$$

$$\overline{h} = \sum_{i=1}^{n} h_i \quad (4)$$

where $h_i$ for i=1 to n are the heights of the current connected components and $w_i$ for i=1 to n are the widths of the current connected components.

At the start of this processing, due to noise there will be too many small components in the image. As a result, the estimated area $\overline{nwh}$ is greater than 1/k of the total document area. That is, if W*H is the document area, then $\overline{nwh}$>W*H/k. By selecting a variable n' representing an estimate of the number of connected components that would result based upon the current average width $\overline{w}$ and current average height $\overline{h}$, i.e., $$n' = \frac{W*H}{k\overline{wh}}.$$

At this point, the estimate n' is less than the number of current connected components n, i.e., n>n'. Therefore, at step 510, the value of n and n' are calculated, and then compared at step 520. An iterative loop is entered so long as n remains greater than no involving steps 510–540.

At step 530, a variable p is calculated based upon the stroke widths of current connected components, since stroke width is an indication of the size of the connected components currently within the image. To determine stroke width, each current component is scanned row by row from top to bottom to identify all runs (i.e., consecutive foreground pixels) and the length of such runs. A run length histogram is generated from this data, and the stroke width is set as the value at the peak of the histogram. In particular, p, is chosen as the minimum stroke width that will fulfill the following equation:

$$\sum_{i=p}^{M} f(i) \leq n' \quad (5)$$

where M is the predetermined maximum stroke width (100 pixels in the preferred embodiment) and f(i) for i=1 to M is the number of components having a stroke width of i (e.g., if there are 5 components having a stroke width of 3, then f(3)=5). Once the variable p is chosen, it is used to set the size of the structure element for the next opening, i.e., p×(p/2), step 540 of FIG. 5, which produces a modified binary image. Processing then returns to step 510, where n and n' are recalculated using the modified binary image. If n remains greater than n', then steps 530, 540 and 510 are repeated until n becomes less than or equal to n', when this first pre-processing method stops.

The benefit of this preprocessing method is that it adaptively selects the opening structural element. This method is suitable for extracting large title characters, but not for small title characters whose stroke width is similar to the opening structural element size, since small title characters may be broken into smaller parts. Another drawback of this method is that problems may arise when operating on documents including photos or pictures, which may become broken up into many smaller regions. Also, this method is somewhat time intensive.

Figure 6:
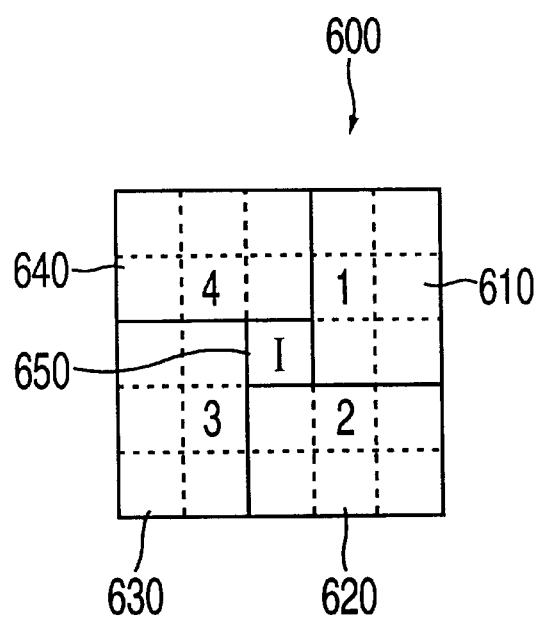
FIG. 6 is a diagram of an example 5×5 sliding window used in one aspect of the present invention.

Referring now to FIG. 6, a second preprocessing method involves hole-filling. This method slides a template (i.e., sliding window 600 shown in FIG. 6) across the entire image to identify holes to fill. In order to minimize the effect of this method on edges, sliding window 600 is divided into four regions 610–640 with examining pixel I (650) in the center. Since noise is randomly distributed within the image, the following four feature values are then obtained:

1. Sum(1)=SUM(zero value pixels in region 1);
2. Sum(2)=SUM(zeros value pixels in region 2);
3. Sum(3)=SUM(zeros value pixels in region 3);
4. Sum(4)=SUM(zeros value pixels in region 4).

At each position of the sliding window, the zero counts are calculated for all four regions, and compared according to the following pseudocode:

if Sum(1)>0 and Sum(2)>0 and Sum(3)>0 and Sum(4)>0 and
     (Sum(1)+Sum(2)+Sum(3)+Sum(4))>5
     Set I to Zero//Fill a hole in background
   elseif (Sum(1)+Sum(2)+Sum(3)+Sum(4))<=3
     Set I to One//Fill a hole in foreground This method is suitable for title characters whose stroke width is larger than 5 pixels in the preferred embodiment and is easier to implement than the first preprocessing method presented above. However, this method is not suitable for title characters whose stroke width is less than 5 pixels in the preferred embodiment, and it cannot remove bold connections between any components. In addition, as one of reasonable skill in the art will recognize, the values chosen for comparison listed above are the preferred values, but may be varied and still provide acceptable results.

Finally, the third preprocessing step presented herein is a simple morphological method which performs a simple opening operation. This is the preferred method used in the present invention. A structural element size of 3×3 is used in the preferred embodiment for the case where the stroke width of a title character is predefined to be greater than three pixels. Setting the structural element size to 3×3 permits speckle noise and false connection lines to be removed, without affecting title characters.

This method does not attempt to fill small holes inside of connected components because holes inside of connected components are caused by the variance of pixel intensity from the surrounding pixels.

One extra step, for removing small connected components and which consequently speeds up the later processes, may be preferably performed after the morphological opening step as follows:

$N_p$ is set to be the number of pixels for a connected component, and $N_{cc}$ is set to be the number of components within the image.

Then, the minimal threshold of $N_p$ is set to be $T_p$, such that if $N_p<T_p$, the connected component being examined is removed. The threshold $T_p$ is a function of $N_{cc}$, i.e., $T_p=f(N_{cc})$. Preferably, a linear function is used, i.e., $T_p=k\ N_{cc}$, where k is a constant, so that the value of the threshold $T_p$ varies proportionally to the number of connected components.

Next, at step 133 (FIG. 1), each image is processed to identify all of the connected components located therein. This processing is performed in a conventional manner, as readily known by one of ordinary skill in the art.

Two further pre-processing steps may preferably be applied after generating the connected components within each image (step 133 of FIG. 1). First, small line components are removed. For components whose number of pixels is smaller than a predetermined minimal pixel threshold, these components are eliminated. In particular, line components are removed when the following criterion is satisfied:

$$\max\{w(I), h(I)\}/\min\{w(I), h(I)\}>PT$$

where $\max\{w(I), h(I)\}$ is the greater of the height or width of connected component I and $\min\{w(I), h(I)\}$ is the lesser of the height or width of connected component I. In the preferred embodiment, the threshold PT is set to 20. In this manner, this step is useful in detecting horizontal or vertical line objects, where, for a vertical line, the maximum height is large and the minimum width is small. However, this step is not suitable for detecting diagonal line objects.

A second common preprocessing step may be used to differentiate between photos and character components. Prior art methods operating on binary document images determine the existence of a photo region based on connected component size, since a photo region tends to be a very large connected component. However, when operating on complex grayscale (or color) images, photos may break into a number of isolated small connected components due to multi-level thresholding step 110 (FIG. 1) and the variance of grayscale intensity in the original image. In addition, these isolated small connected components may reside in different layers. Therefore, prior art photo extraction methods are not suitable for complex grayscale images. In addition, due to the complexity of grayscale images, titles within a photo may not be ignored, since even an identified photo region must still be examined to look for possible titles, especially since it may not be as easy identify a photo in a grayscale (or color) document image having complex background as it is for a binary document image. The following criteria may be used to identify such photo regions (which are not tide regions) to allow such extraction. To be considered a photo component (region), the region being examined has to satisfy one the following predetermined conditions:

(1) bounding box size>(entire document size/k ); or (2) a component encircles another component, AND bounding box size>( entire document size/2k).

where k is a parameter, set to 12 in the preferred embodiment.

Figure 7:
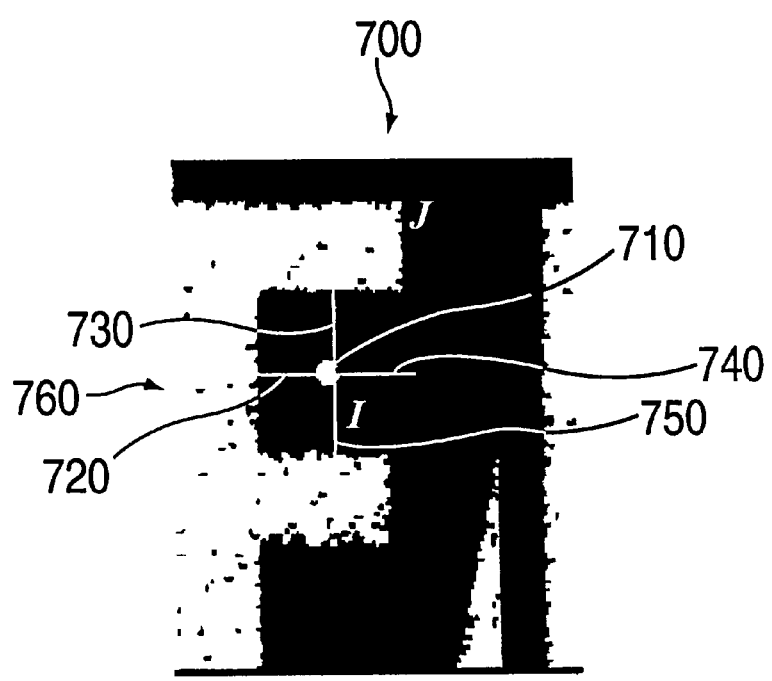
FIG. 7 is a simulated enlarged view of a scanned image used to illustrate an example of encirclement according to another aspect of the present invention.

Referring now to simulated scanned image 700 of FIG. 7, how to determine whether a component encircles another component presents certain difficulties. In the present invention, a simple method is used. As illustrated in FIG. 7, for any point on component 710, four lines 720–750 pointing to the four different directions are drawn (i.e., left line 720, upper line 730, right line 740, lower line 750). If the four lines, e.g., lines 720–750, link to the same component 760, component 710 is determined to be encircled by component 760 and thus is subject to being removed if its bounding box size is greater than the predetermined threshold given above. In simulated scanned image 700 of FIG. 7, line 740 does not link component 710 to component 760 and thus it is not subject to being removed.

Referring now to step 140 of FIG. 1, one difficulty in identifying tide regions in a grayscale image is due to clustering. As one of ordinary skill in the art will recognize, a "cluster" is usually defined as a relatively well connected region having a similar data-density. With respect to the present invention, a cluster is more specifically defined as a group of relative close and similar connected components (where connected components refers to an object having a maximal set of touching black pixels) and clustering refers to the formation of a cluster. The main task in identifying possible title regions (clusters) is to identify homogeneous groups of objects based on their features (dimensions). Stated another way, when there are connected components in an image, the feature space of these components must be identified, and then these components are clustered when the identified feature space is closely related. Therefore, the features used to identify the components must be appropriately selected. Among prior art clustering methods, the K-means method is widely used. However, the drawback of the K-means method is that the number of resulting clusters needs to be specified in advance. Therefore, the method of the present invention uses the hierarchy clustering method, which requires no a priori knowledge of the image to operate properly.

The following seven feature values are obtained from a connected component whose index value is I in the clustering method of the present invention:

| | | |
|---|---|---|
| (1) | bounding box height | H(I) |
| (2) | bounding box width | W(I) |
| (3) | center point y coordinate | center_y(I) |
| (4) | center point x coordinate | center_x(I) |
| (5) | stroke width | stroke_w(I) |
| (6) | gray intensity mean | gray_mean(I) |
| (7) | gray intensity standard deviation | gray_std(I) |

The bounding box size (i.e., the height H(I) and width W(I)) and its center location (center_y(I) and center_x(I)) are easily identified.

Figure 8:
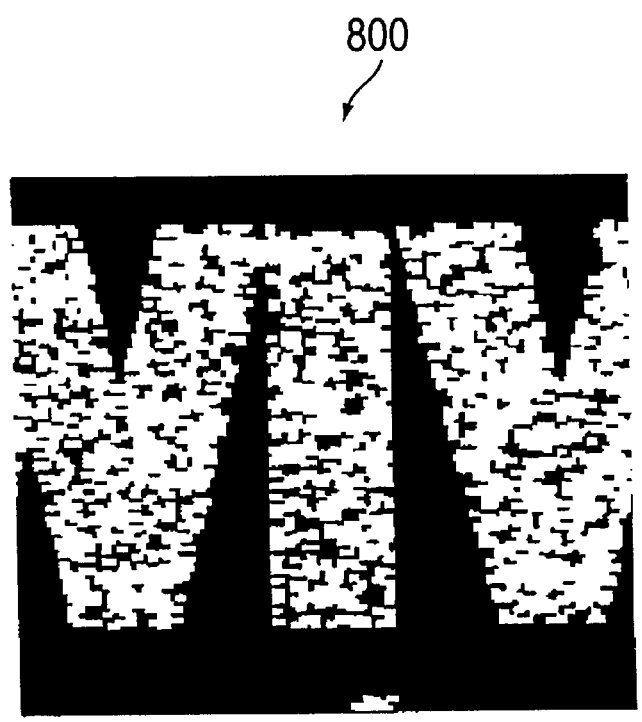
FIG. 8 is a simulated enlarged view of a scanned image used to illustrate an example of connected components according to still another aspect of the present invention.

As mentioned above, stroke width (i.e., stroke_w(I)) is determined by scanning each component row by row from top to bottom to identify all runs (i.e., consecutive foreground pixels) and the length of such runs. A run length histogram is generated from this data, and the stroke width is set as the value at the peak of the histogram. In most cases, the identified stroke width represents the stroke width of a character (i.e., a connected component). However, sometimes there are many holes within a connected component, which holes can greatly affect the accuracy of the above stroke width determination. Referring to simulated scanned image 800 in FIG. 8, a connected component having a plurality of holes is shown therein. There are two ways to solve the stroke width problem that results when operating on such a connected component. One way is to fill the holes first and then get the stroke width value after the filling. This, however, can sometimes cause large block backgrounds to be falsely filled. A simpler way is to set a min_num threshold for each connected component such that if the width of a hole is less than the min_num threshold, the hole is assumed to be noise and thus filled, otherwise the hole is considered background and is ignored.

The values for gray_mean(I) and gray_std(I) are calculated using data from the original grayscale image for the respective connected component.

Figure 9:
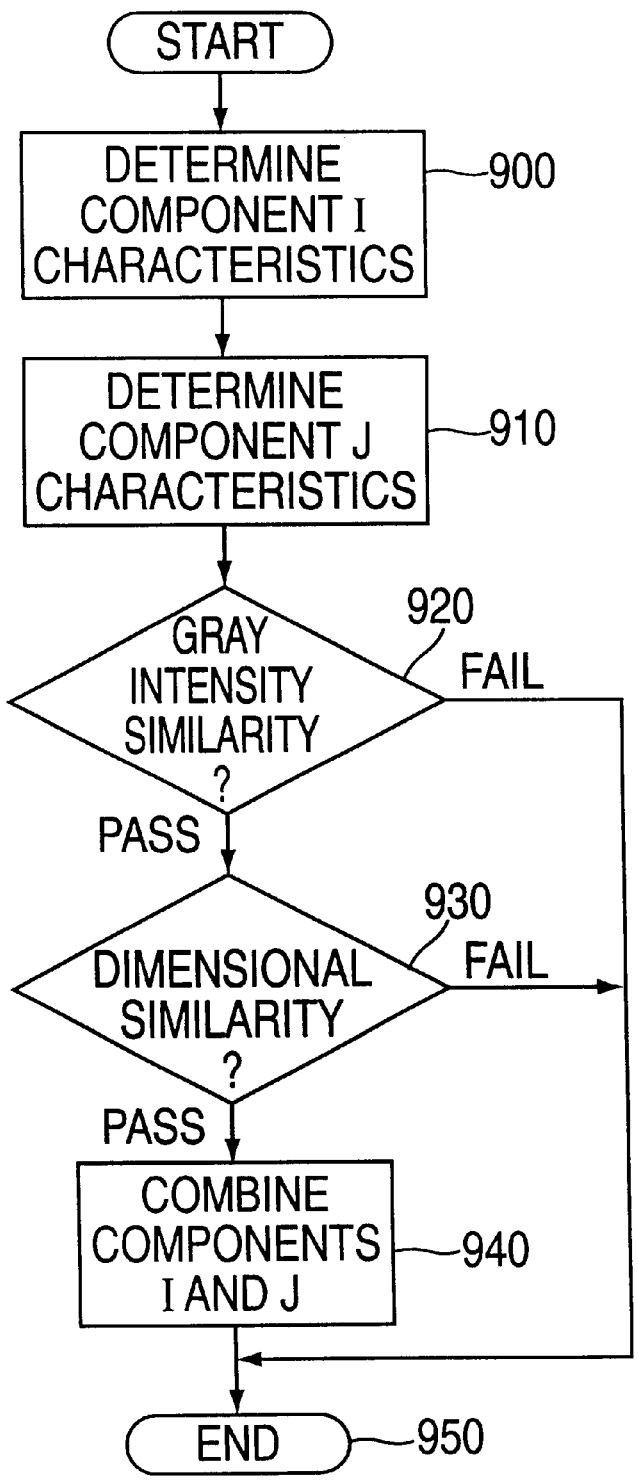
FIG. 9 is a flow chart of the cluster algorithm.

Referring now to the flowchart of FIG. 9, two separate connected components are merged together by the processing defined therein if their feature similarity falls within a pre-determined range. The method of the present invention does not require that the number of different connected components to be known in advance. A number of different measures of feature similarity are used by the present invention to compare two different connected components, each of which depends on the component features described above. These measures include:

1. Bounding Box Height Similarity $$S_1(i, j) = \frac{|H(j) - H(i)|}{\max(H(j), H(i))} \quad (6)$$

2. Bounding Box Width Similarity $$S_2(i, j) = \frac{|W(j) - W(i)|}{\max(W(j), W(i))} \quad (7)$$

3. Stroke Width Similarity $$S_3(i, j) = \frac{|\text{stroke\_w}(j) - \text{stroke\_w}(i)|}{\max(\text{stroke\_w}(j), \text{stroke\_w}(i))} \quad (8)$$

4. Distance $$S_4(i, j) = \frac{NearestEdgeDist(i, j)}{\sqrt{(\text{center\_x}(i) - \text{center\_x}(j))^2 + (\text{center\_y}(i) - \text{center\_y}(j))^2}} \quad (9)$$

where NearestEdgeDist(i,j) refers to the shortest distance between an edge of connected component i and an edge of connected component j.

5. Gray Intensity Mean Similarity $$S_5(i, j) = |\text{gray\_mean}(i) - \text{gray\_mean}(j)| \quad (10)$$

6. Gray Intensity Standard Deviation Similarity $$S_6(i,j) = |\text{gray\_std}(i) - \text{gray\_std}(j)| \quad (11)$$

In the above equations, the lower the value that results, the more similar the two components i and j. In the present invention, the feature values for two components, I and J, are first calculated (see Steps 900 and 910 of FIG. 9) and then the gray intensity mean similarity, i.e., $S_5(i,j)$, and gray intensity standard deviation similarity, i.e., $S_6(i,j)$, are calculated and checked at step 920 of FIG. 9. If both of these values fall below predetermined thresholds, further similarity checking is performed at step 930, otherwise the two components are considered not similar and processing continues at step 950.

A dimensional similarity is examined in performing the further similarity checking of step 930 in FIG. 9. The dimensional similarity is defined as:

$$S_{dim}(i, j) = \begin{cases} \infty & \text{if } S_p(i, j) > T_p \text{ for any } p \in [1, 4] \\ \sum_{k=1}^{4} a_k S_k(i, j) & o.w. \end{cases} \quad (12)$$

where $a_k$'s are the weights for similarity measures $S_1$–$S_4$; $T_p$'s, for p=1 . . . 4, are the maximum acceptable threshold for each similarity measure (all set to ½ in the preferred embodiment of the present invention). The dimensional similarity, $S_{dim}$, is a combination of bounding box width, height, stroke width similarities and distance, which all relate to the dimensional properties of components. As one of reasonable skill in the art will readily recognize, the weights, i.e., values for $a_k$'s, can be obtained by way a training process, e.g., a neural network. In the present invention, the following values are simply assigned:

$a_1$=0.5; $a_2$=0.5; $a_3$=1.0; and $a_4$=1.0.

Thus, if the value for $S_{dim}(i,j)$ is found to be below a pre-defined threshold at step 930, components I and J are considered similar and thereafter combined at step 940. Otherwise, they are considered not similar and processing continues at step 950.

When two components are determined to be similar, they are then clustered together to form a group of components by generating a linked list of each original component. The features of each component in the group are maintained within the linked list. For all components within each group, the feature values for each component are replaced by the mean values of that feature for every component within the group, except for the features center_x(i) and center_y(i), which remains the same for each component i. For example, if there are a set of components $c_i$(i=1 . . . n) in a cluster, each component having its features $H(c_i)$, $W(c_i)$, center_y(c), center_x(c), stroke_w($c_i$), gray_mean($c_i$) and gray_std ($c_i$), all for i=1 . . . n. The new feature values after the components are merged (clustered) are:

$$\overline{H(c)} = \sum_{i=1}^{n} H(c_i) \quad (13)$$

$$\overline{W(c)} = \sum_{i=1}^{n} W(c_i) \quad (14)$$

$$\overline{\text{stroke\_w}(c)} = \sum_{i=1}^{n} \text{gray\_mean}(c_i) \quad (15)$$

$$\overline{\text{gray\_mean}(c)} = \sum_{i=1}^{n} \text{gray\_mean}(c_i) \quad (16)$$

$$\overline{\text{gray\_std}(c)} = \sum_{i=1}^{n} \text{gray\_std}(c_i) \quad (17)$$

As stated above, the features center_x(i) and center_y(i) remain unchanged within the feature list for each connected component. As one of ordinary skill in the art will readily recognize, although the preferred embodiment of the present invention requires that the input image be first subjected to a multi-level thresholding step, the clustering step 140 (FIG. 1) of the present invention will operate on any binary image, whether it was produced by multi-level thresholding or by binary thresholding.

Referring now back to FIG. 1, after each image is clustered (step 140 of FIG. 1), a post-processing step 150 is applied which first merges strokes and then filters non-title component regions.

Figure 10:
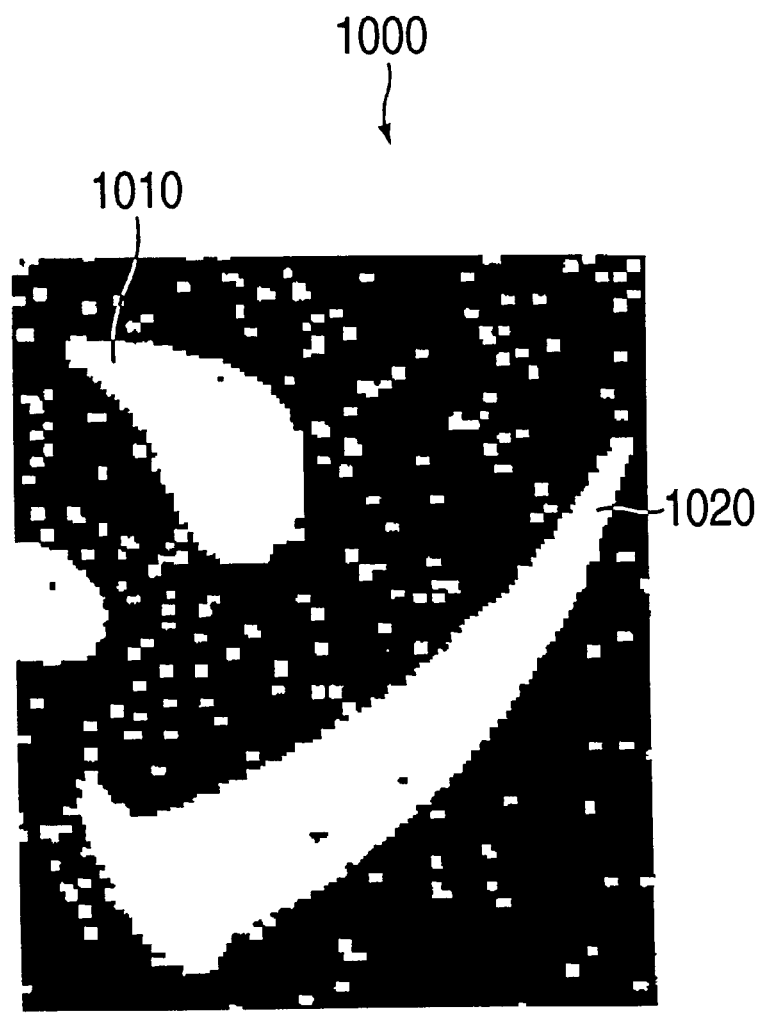
FIG. 10 is a simulated scanned image illustrating the variation in size of radicals which appear in languages such as Japanese and Chinese.

With respect to merging strokes, in some languages, such as Chinese and Japanese, most of the characters are composed of a set of isolated strokes (radicals). Since, as shown in simulated scanned image 1000 in FIG. 10, the size of stroke components varies greatly (see elements 1010 and 1020 in FIG. 10), such stroke components must necessarily be merged into possible characters. Preferably the following method is employed, which method will not cause any adverse effects for non-radical language titles (i.e., English character titles). Therefore, the method of the present invention is language-independent.

In a merged component set $c_i(i=1 \ldots n)$, two components $c_j$, $c_{j'}$, where $j,j' \in [1,n]$, can be merged together to form a new component which is more likely a complete character if they satisfy the following two equations:

$$H(c_j)/2 + H(c_{j'})/2 + |\text{center\_y}(c_j) - \text{center\_y}(c_{j'})| \leq k(\overline{H(c)} + \sigma_h) \quad (18)$$

$$W(c_j)/2 + W(c_{j'})/2 + |\text{center\_x}(c_j) - \text{center\_x}(c_{j'})| \leq k(\overline{W(c)} + \sigma_w) \quad (19)$$

where $H(c_j)$ is the height of the component $c_j$, $W(c_j)$ is the width of the component $c_j$, and k is a constant preferably set to 1.2. In addition $\overline{H(c)}$, $\overline{W(c)}$ are determined by the equations:

$$\overline{H(c)} = \frac{\sum_{i=1}^{n} H(c_i)}{n} \quad (20)$$

$$\overline{W(c)} = \frac{\sum_{i=1}^{n} W(c_i)}{n} \quad (21)$$

and $\sigma_h$, $\sigma_w$ are determined by the equations:

$$\sigma_h = \sqrt{\frac{\sum_{i=1}^{n}(H(c_i) - \overline{H(c)})^2}{n-1}} \quad (22)$$

$$\sigma_w = \sqrt{\frac{\sum_{i=1}^{n}(W(c_i) - \overline{W(c)})^2}{n-1}} \quad (23)$$

Once two components are merged within this post-processing step, they will be replaced by a newly merged component, and the number of components within the linked list is reduced by one. Similar to clustering (equations 13–17), the features of the newly merged component are obtained by averaging the corresponding features from each. However, the bounding boxes will be merged into one, and a new center_x(i) and center_y(i) will be calculated for the new component. This merging process continues until no two components within the same component set can further be merged.

A clustered group consists of a linked list of the components in the cluster. Since each component maintains its own feature information, clustering information and individual component information for components within the cluster are available for. post-processing Therefore, non-title components may preferably be identified from the components in clustered component groups and thereafter removed by determining whether such component satisfies one of the following conditions (resulting in the determination that it is a non-title component):

1. If the component is a stand alone component;
2. For a set composed of two title components, if the two components are not substantially aligned in the vertical or horizontal direction;
3. For a set composed of three title components, if there are not at least two tide components which are substantially aligned in the horizontal or vertical direction;
4. If the number of linked components within a cluster is larger than a threshold T, set to 100 in the preferred embodiment of the present invention, the components within this cluster are likely to be non-tide characters assuming the number of characters included in a tide is less than T.
5. For a linked components list, if the standard deviation values of gray intensity mean divided by the number of linked components is larger than a threshold, set to 0.2 in the preferred embodiment, these components are considered non-tides.
6. For a linked components set, if the standard deviation of height divided by the mean of height is larger than a threshold, set to 0.5 in the preferred embodiment, or the standard deviation of width divided by the mean of width is larger than a threshold, set to 0.5 in the preferred embodiment, these components are considered non-titles.

Now referring back to FIG. 1, the merging of the results of the processing is first performed at step 160 by merging clustered component groups within the same layer.

In clustering methods, some components that belong to the same title may sometimes be clustered into different groups. The goal of the merging step 160 of FIG. 1 is to merge these groups together. The basis of this step is that for any two components belonging to two different clusters, if these components satisfy pre-determined criteria, i.e., the nearest neighborhood similarity criterion and the shape similarity criterion defined below, they are considered to be the same title, and are thus merged together. The nearest neighborhood similarity criterion is defined as:

$$S_d(i, j) = \frac{\sqrt{(\text{center\_x}(i) - \text{center\_x}(j))^2 + (\text{center\_y}(i) - \text{center\_y}(j))^2}}{\max(average(h(c_i), h(c_j)), average(w(c_i), w(c_j)))} \quad (24)$$

and if $S_d(i,j) < T_d$, then the two components i and j are considered to be close together. $T_d$ is the predetermined maximum threshold for the nearest neighborhood similarity criteria.

The shape similarity criterion is defined as:

$$S(i, j) = \begin{cases} \infty & \text{if } S_p(i, j) > T_p \text{ for any } p \in [1, 3] \\ \sum_{k=1}^{3} a_k S_k(i, j) & o.w. \end{cases} \quad (25)$$

where $S_k(i,j)$ for $k=1 \ldots 3$ are the bounding box height similarity ($S_1(i,j)$, equation 6), the bounding box width similarity ($S_2(i,j)$, equation 7) and the stroke width similarity ($S_3(i,j)$, equation 8), respectively, as defined above. In addition, $T_p$ for $p=1 \ldots 3$ are the maximum acceptable thresholds for each similarity measure, all set to 0.5 in the preferred embodiment and ak for $k=1 \ldots 3$ are the weights, preferably set to 0.5, 0.5, and 1.0, respectively. $T_S$ is the predetermined maximum threshold for shape similarity. If $S(i,j) < T_S$, then the two components i and j are considered to be similar in shape.

As a result of this step, if $S_d(i,j)<T_d$ and $S(i,j)<T_S$ are both found to be true, then the two components i and j and their associated groups are merged. A merge within a layer may be performed between any two components from differing groups, and the results are newly formed groups comprising each of the original groups. The conditions imposed for merging components in this step are not as strict as the clustering step 140, since much noise is eliminated in the clustering step 140 and post-processing step 150. Also, the grayscale/color intensity is not considered when performing this step. Finally, as in the clustering step 140, merged components are represented by their mean feature values (see equations 13–17), including the center_x(i) and center_y(i) features, in this case.

As discussed above, during multi-level thresholding, a title may be segmented into different layers due to grayscale intensity variations within an image. In step 190 of FIG. 1, connected components are considered for possible merging with components from other layers. The same merging criteria are used as those described above with respect to the merging of components within the same layer (i.e., the criteria defined by equations 24 and 25).

Once step 190 of FIG. 1 is complete, the remaining connected components represent identified title regions for output to the user.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A method of delineating titles within a grayscale image, comprising the steps of:
    (A) multi-level thresholding a grayscale image stored in memory to obtain a plurality of binary images;
    (B) identifying connected components within each of said binary images;
    (C) clustering said connected components within each of said binary images to identify possible title regions in each of said images; and
    (D) combining said identified possible title regions from each of said binary images for output.

2. The method of claim 1, wherein said multi-level thresholding step comprises the steps of:
    (A) generating a histogram of the number of runs that would result from thresholding said grayscale image at each intensity level within said grayscale image;
    (B) generating a sliding profile of said histogram;
    (C) identifying each peak within said sliding profile and an intensity level value at each peak; and
    (D) thresholding said grayscale image at each of said intensity level values to produce a plurality of binary images.

3. The method of claim 1, wherein said clustering step comprises the steps of:
    (A) pairing each of said connected components with each other of said connected components within said binary image;
    (B) comparing the difference in at least one gray intensity characteristic between each connected component within said pairs of connected components to a first predetermined threshold;
    (C) when said difference in said at least one gray intensity characteristic between each connected component within a pair of connected components is less than said first predetermined threshold, comparing the difference in at least one dimensional characteristic between each connected component within said pair of connected components to a second predetermined threshold; and
    (D) when said difference in at least one dimensional characteristic between each connected component within said pair of connected components is less than said second predetermined threshold, combining said components within said pair of connected components.

4. The method of claim 1, wherein said clustering step comprises the steps of:
    (A) pairing each of said connected components with each other of said connected components within said binary image;
    (B) comparing the difference in at least one gray intensity characteristic between each connected component within said pairs of connected components to a first predetermined threshold;
    (C) when said difference in at least one gray intensity characteristic between each connected component within said pair of connected components is less than said first predetermined threshold, combining said components within said pair of connected components.

5. The method of claim 1, wherein said clustering step comprises the steps of:
    (A) pairing each of said connected components with each other of said connected components within said binary image;
    (B) comparing the difference in at least one dimensional characteristic between each connected component within said pairs of connected components to a first predetermined threshold; and
    (D) when said difference in at least one dimensional characteristic between each connected component within said pair of connected components is less than said first predetermined threshold, combining said components within said pair of connected components.

6. The method of claim 3, wherein said at least one gray intensity characteristic comprises at least of one characteristic selected from a group consisting of a mean of the intensity within said connected component and a standard deviation of the intensity within said connected component.

7. The method of claim 4, wherein said at least one gray intensity characteristic comprises at least of one characteristic selected from a group consisting of a mean of the intensity within said connected component and a standard deviation of the intensity within said connected component.

8. The method of claim 3, wherein said at least one dimensional characteristic comprises at least of one characteristic selected from a group consisting of a height of said connected component, a width of said connected component, a maximum stroke width of said connected component, and a shortest distance between edges of each of said connected components.

9. The method of claim 5, wherein said at least one dimensional characteristic comprises at least of one characteristic selected from a group consisting of a height of said connected component, a width of said connected component, a maximum stroke width of said connected component, and a shortest distance between edges of each of said connected components.

10. A method of delineating titles within a binary image, comprising the steps of:

(A) identifying connected components within said binary image; and (B) clustering said connected components within said binary image to identify possible title regions in said binary image by the further steps of:

(1) pairing each of said connected components with each other of said connected components within said binary image;

(2) comparing the difference in at least one gray intensity characteristic between each connected component within said pairs of connected components to a first predetermined threshold;

(3) when said difference in said at least one gray intensity characteristic between each connected component within a pair of connected components is less than said first predetermined threshold, comparing the difference in at least one dimensional characteristic between each connected component within said pair of connected components to a second predetermined threshold; and (4) when said difference in at least one dimensional characteristic between each connected component within said pair of connected components is less than said second predetermined threshold, combining said components within said pair of connected components.

11. A method of delineating titles within a binary image, comprising the steps of:

(A) identifying connected components within said binary image; and (B) clustering said connected components within said binary image to identify possible title regions in said binary image by the further steps of:

(1) pairing each of said connected components with each other of said connected components within said binary image;

(2) comparing the difference in at least one gray intensity characteristic between each connected component within said pairs of connected components to a first predetermined threshold;

(3) when said difference in at least one gray intensity characteristic between each connected component within said pair of connected components is less than said first predetermined threshold, combining said components within said pair of connected components.

12. A method of delineating titles within a gray scale image, comprising the steps of:

(A) multi-level thresholding said gray scale image to obtain a plurality of binary images:

(B) identifying connected components within each of said binary images; and (C) clustering said connected components within each of said binary images to identify possible title regions in each of said binary images by the further steps of:

(1) pairing each of said connected components with each other of said connected components within said binary image;

(2) comparing the difference in at least one dimensional characteristic between each connected component within said pair of connected components to a first predetermined threshold; and (3) when said difference in at least one dimensional characteristic between each connected component within said pair of connected components is less than said first predetermined threshold, combining said components within said pair of connected components.

13. The method of claim 10, wherein said at least one gray intensity characteristic comprises at least of one characteristic selected from a group consisting of a mean of the intensity within said connected component and a standard deviation of the intensity within said connected component.

14. The method of claim 11, wherein said at least one gray intensity characteristic comprises at least of one characteristic selected from a group consisting of a mean of the intensity within said connected component and a standard deviation of the intensity within said connected component.

15. The method of claim 10, wherein said at least one dimensional characteristic comprises at least of one characteristic selected from a group consisting of a height of said connected component, a width of said connected component, a maximum stroke width of said connected component, and a shortest distance between edges of each of said connected components.

16. The method of claim 12, wherein said at least one dimensional characteristic comprises at least of one characteristic selected from a group consisting of a height of said connected component, a width of said connected component, a maximum stroke width of said connected component, and a shortest distance between edges of each of said connected components.

17. A method of delineating titles within a grayscale image, comprising the steps of:

(A) receiving a grayscale image;

(B) multi-level thresholding said grayscale image to obtain a plurality of binary images;

(C) preprocessing each of said binary images to filter noise components from each of said images;

(D) clustering connected components within each of said binary images to identify possible title regions in each of said images;

(E) postprocessing each of said binary images to merge possible title regions comprising strokes and to remove non-title regions from said possible title regions in each of said images by comparing characteristics of said possible title regions to pre-determined criteria;

(F) merging certain of said possible title regions within each of said binary images which satisfy pre-determined criteria;

(G) combining said possible title regions within each of said binary images; and (H) merging certain of said possible title regions from separate binary images which satisfy pre-determined criteria.

18. The method of claim 17, wherein said preprocessing step comprises a morphological opening operation consisting of the steps of:

(A) performing an erosion step using a structural element having a predetermined size smaller than the expected stroke width of a character within a title; and (B) performing a dilation step using said structural element.

* * * * *